United States Patent [19]

Andersen et al.

[11] 3,764,673
[45] Oct. 9, 1973

[54] PHARMACEUTICAL COMPOSITIONS COMPRISING ALKYLSILYL ETHERS OF PROSTAGLANDINS

[75] Inventors: Niels H. Andersen, Seattle, Wash.; Ned M. Weinshenker, Sunnyvale, Calif.

[73] Assignee: Alza Corporation, Palo Alto, Calif.

[22] Filed: Feb. 19, 1971

[21] Appl. No.: 117,050

[52] U.S. Cl. ............................................. 424/184
[51] Int. Cl. ............................................. A61k 27/00
[58] Field of Search .................................... 424/184

[56] References Cited
UNITED STATES PATENTS
3,651,116   3/1972   Lincoln et al.................. 260/468 D

*Primary Examiner*—Sam Rosen
*Attorney*—Paul L. Sabatine and Steven D. Goldby

[57] ABSTRACT

Novel pharmaceutical compositions comprising compounds of the formula:

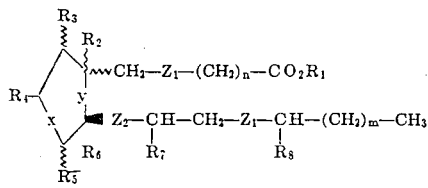

wherein $R_1$ is hydrogen, a lower alkyl or $R_9$; $R_2$ and $R_6$ are both hydrogen when $y$ is single bond and $R_2$ and $R_6$ are both absent when $y$ is a double bond; $R_3$ is keto,

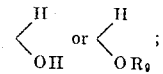

$R_4$ is hydrogen or

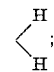

$R_5$ is hydrogen,

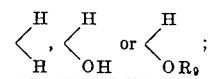

$R_7$ is $OR_9$; $R_8$ is hydrogen or $OR_9$; $R_9$ is

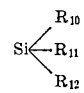

wherein
$R_{10}$ is hyrogen or lower alkyl; $R_{11}$ and $R_{12}$ are the same or different lower alkyl; $Z_1$ is a cis or trans $-CH=CH-$ or $-CH_2CH_2-$; $Z_2$ is trans $-CH=CH-$ or $-CH_2CH_2-$; $x$ is a single or double bond and $x$ is a double bond when $R_4$ and $R_5$ are hydrogen; $y$ is a single or double bond; $n$ is 2 to 5; $m$ is 0 to 4; the non-toxic salts and non-toxic carrier. The pharmaceutical compositions possess valuable pharmacological properties as modifiers of smooth muscle activity, gastric secretion, blood pressure, lipolysis and the reproductive system. The compositions can also be used for the relief of asthma and nasal congestion, and they have utility as platelet anti-clumping agents.

16 Claims, No Drawings

PHARMACEUTICAL COMPOSITIONS COMPRISING ALKYLSILYL ETHERS OF PROSTAGLANDINS

BACKGROUND OF THE INVENTION

This invention pertains to new and useful pharmaceutical compositions of matter. More particularly, the invention pertains to pharmaceutical compositions which embody lower alkylsilyl ethers of prostaglandin compounds of the Formula I:

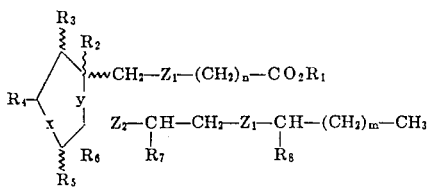

wherein $R_1$ is hydrogen, a lower alkyl or $R_9$; $R_2$ and $R_6$ are both hydrogen when $y$ is a single bond and $R_2$ and $R_6$ are both absent when $y$ is a double bond; $R_3$ is keto,

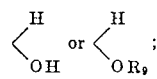

$R_4$ is hydrogen or

$R_5$ is hydrogen,

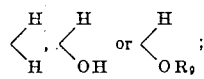

$R_7$ is $OR_9$; $R_8$ is hydrogen or $OR_9$; $R_9$ is

wherein $R_{10}$ is hydrogen or lower alkyl; $R_{11}$ and $R_{12}$ are the same or different lower alkyl; $Z_1$ is a cis or trans —CH=CH— or —CH$_2$CH$_2$—; $Z_2$ is trans —CH=CH— or —CH$_2$CH$_2$—; $x$ is a single or double bond and $x$ is a single bond when the ring carbon atom at $R_4$ and $R_5$ is

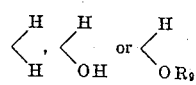

and $x$ is a double bond when $R_4$ and $R_5$ are hydrogen; $y$ is a single or double bond; $n$ is 2 to 5; $m$ is 0 to 4; the non-toxic pharmaceutically acceptable salts; and a non-toxic pharmaceutically acceptable carrier.

In the definitions of symbols and terms in the foregoing formula and where they appear elsewhere throughout this specification and the accompanying claims, their usage thereof has the following significance;

By lower alkyl group is meant straight or branched chain alkyl hydrocarbon groups containing one to eight carbon atoms inclusive, such as methyl, ethyl, n-propyl, iso-propyl, n-butyl; tert-butyl, n-pentyl, neo-pentyl, n-hexyl, iso-hexyl, n-octyl, heptyl and the like.

The term "pharmaceutically acceptable, non-toxic salts" of the lower alkylsilyl ethers of prostaglandin of Formula I and elsewhere in the disclosure and accompanying claims includes the non-toxic alkali metal and the non-toxic alkaline earth bases such as sodium, potassium, calcium, copper and magnesium, the hydroxides and carbonates thereof, and the ammonium salts and substituted ammonium salts, for example, the non-toxic salts of trialkylamines such as triethylamine, trimethylamine, triisopropylamine, tri-n-propylamine and other acceptable organic amines such as morpholine, diethylamine, diemthylamine, methyl cyclohexylamine, N-bensyl-β-phenylethylamine, ethyldimethylamine, benzylamine, N-(lower)alkyl piperidines such as N-ethylpiperidine, N-methylpiperidine and other pharmaceutically acceptable amines. Also, non-toxic acceptable salts with mono-alkyl and di-alkylamines, and salts formed from compounds of Formula I ($R_1$=H) and tetra-alkylammonium hydroxides. The latter are generally art called therapeutically acceptable quaternary ammonium salts.

The term "lower alkylsilyl" as used herein denotes lower alkyl groups of one to eight carbon atoms as defined above bonded to the silicon atom, Si. The lower alkyl groups bonded to the silicon backbone may be the same or they may be different. Typical lower alkylsilyl groups included within the scope of the term and the instant invention are trimethylsilyl, triethylsilyl, tri-n-propylsilyl, triisopropylsilyl, tributylsilyl, tri-n-hexylsilyl, tri-neopentyl-silyl, dimethylsilyl, diethylsilyl, diisopropylsilyl, diheptylsilyl, dioctylsilyl, monomethyldiethylsilyl, monoethyldimethylsilyl, monoisopropyldiethylsilyl, monomethyldipropylsilyl, and the like.

The numbering system and the stereochemistry nomenclature used for the prostaglandin ethers of the invention is the art accepted numbering and nomenclature. That is, the cyclopentane ring of the prostanoic acid is numbered 8 through 12 inclusive, the carboxyl side chain attached to the cyclopentane ring at its 8 position and the alkyl side chain attached to the cyclopentane at its 12 position. The stereochemistry of the substitutents on the 5-membered cyclopentane ring may be α-oriented or β-oriented, as indicated by a wavy line. The dashed line indicates an α-orientation and the solid wedged line indicates a β-orientation; that is, α-substitutents are oriented on the opposite side of the cyclopentane ring as the ω-terminal chain, and β-substitutents are oriented in the opposite sense, that is, on the same side as the alkyl side chain. The substitutents attached to the alkyl side chain may have a sinister (S) or rectus (R) configuration which for these compounds in the projection shown, is the equivalent nomenclature of α and β respectively. The lower alkylsilyl ether prostaglandins depicted by Formula I and elsewhere in the specification and the accompanying claims includes the analogues and all the diastereomers thereof, and in addition the enantiomeric forms and such mixtures as are designated racemates. In the general formulae as illustrated herein, the substitutents at positions $R_3$, $R_4$, $R_5$ and the like depicted by

and the like indicates in the formulae shown that both groups, for example, the hydrogen and hydroxyl, are bonded to the carbon atom of the cyclopentane ring. The numbering system and stereochemistry nomenclature is disclosed in Progress In The Chemistry of Fats and Other Lipids, Vol IX, Part 2, pages 233 to 273, 1968, Pergamon Press, New York; and, J. Lipids Research, Vol 10, pages 316 to 319, 1969.

DESCRIPTION OF INVENTIVE EMBODIMENTS

The valuable and useful pharmacological lower alkylsilyl prostaglandin ethers suitable for the purpose of the invention as represented by Formula I and in the accompanying claims are prepared from the corresponding prostaglandin compound or prostaglandin intermediate by synthetically and separately converting them to the appropriate lower alkylsilyl prostaglandin ether compounds. The corresponding starting prostaglandin can be represented by Formula II:

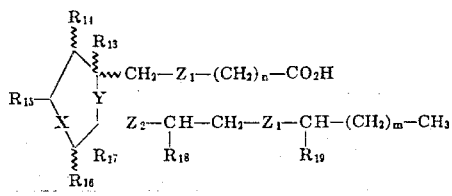

wherein $R_{13}$ and $R_{17}$ are both hydrogen when y is a single covalent bond and $R_{13}$ and $R_{17}$ are absent when y is a double covalent bond; $R_{14}$ is keto group or

$R_{15}$ is hydrogen or

$R_{16}$ is hydrogen,

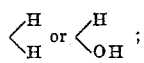

$R_{18}$ is hydroxyl group; $R_{19}$ is hydrogen or hydroxyl; $Z_1$ is a cis or trans unsaturated vinylene radical $-CH=CH-$ or a saturated ethylene radical $-CH_2CH_2-$; $Z_2$ is a trans unsaturated vinylene radical $-CH=CH-$ or it is a saturated ethylene radical $-CH_2CH_2-$; $x$ is a single covalent bond when the cyclopentane ring carbon atom at $R_{15}$ is substituted with

and $R_{16}$ is

or

and $x$ is a double covalent bond when $R_{15}$ and $R_{16}$ are both hydrogen; y is a single covalent bond or it is a double covalent bond as defined under $R_{13}$ and $R_{17}$ above;

n is 2 to 5; and m is 0 to 4.

The starting materials of Formula II as used here to synthesize the lower alkylsilyl prostaglandin ethers of Formula I are prepared in art known ways, either by isolating the starting prostaglandin from natural sources, for example, the vesicular glands of sheep or they can be obtained by the enzymatic conversion from fatty acid substrates such as arachidonic acid, as reported in *Progress of Biochemical Pharmacology*, Vol 3, pages 71 to 82, 1967; *J. of Bio. Chem.*, Vol 242, pages 5344 to 5354, 1967; and *Nature*, Vol 203, pages 839 to 841, 1964.

The prostaglandin compounds of Formula II can also be chemically prepared by well known procedures, for example, from a common synthetic intermediate by the hydrogenation of 11,15-bis(tetrahydropyranyl)ether of 9α,11α,15(S)-trihydroxy-5-cis,13-trans-prostadienoic acid over palladium on carbon followed by hydrolysis and treatment with Jones reagent to give the resulting prostaglandins as reported in *J. Am. Chem. Soc.*, Vol 92, pages 2586 to 2587, 1970; as prepared by the reduction of 2-oxa-3-oxo-6-exo-(trans-3-(S)-hydroxyhept-1-enyl)-endo-7-acetoxy-cis-bicyclo[3.3.0]-octane followed by reduction and treatment with Wittig reagent to give the corresponding prostaglandins as set forth in *J. Am. Chem. Soc.*, Vol 91, pages 5675 to 5677, 1969; by the total synthesis of prostaglandins via a tricarbocyclic intermediate as reported in *Tetrahedron Letters*, Vol 4, pages 307 to 310, 1970; by the total synthesis from 2-oxabicyclo[3.3.0]oct-6-en-3-one, ibid, pages 310 to 311, 1970; and other chemical synthesis embracing prostaglandins within Formula II such as the *J. Am. Chem. Soc.*, Vol 90, pages 3245 to 3247, 1968; ibid, pages 3247 to 3248, 1968; ibid, Vol 91, pages 535 to 536, 1969; ibid, Vol 92, pages 397 to 398, 1970; and in *The Proceedings of the Robert A. Welch Foundation Conference on Chemical Research*, Vol XII, pages 51 to 99, 1969.

The lower alkylsilyl group is introduced onto the prostaglandin starting material of Formula II by intimately contacting and reacting The prostaglandin's free hydroxyl group with a silylating agent in a mutual solvent for the reactants and then recovering the silyl ether prostaglandins. The prostaglandin's hydroxyl groups are reacted or silylated with an excess of a monofunctional silylating agent or with an excess of a bifunctional silylating agent. Generally, about 1 to about 30 or more molecular equivalents of the silylating agent is present in the reacting medium for silylating the hydroxyl groups of prostaglandin, and the reaction will generally take place at about 10°C to 50°C, usually at room temperature of 25°C, for about 10 minutes to 96 hours and under normal atmospheric pressure, or in pressures up to 5 atmospheric pressure. The silylation with a monofunctional silylating agent proceeds in the absence of a catalyst while for the bifunctional silylating agent it is usually preferred to use small amounts of a catalyst. The completely silylated prostaglandins, for example, the tetra and tris substituted can be converted to the di and mono substituted silylated forms of prostaglandin by mildly hydrolyzing the silyls under gentle acidic conditions, usually 0.1 to 1.0 percent acetic acid in a lower alkanol. The silylating agents used for the purpose of the invention can be prepared by the action of the appropriate Grignard reagents on silicon tetrafluoride or sodium silicate as described in *J. Am. Chem. Soc., Vol 58, pages 897 to 898, 1936;* and from hexa (lower) alkyldisiloxane when treated with a halo acid to yield lower alkylhalosilanes, as described in *J. Am. Chem. Soc.*, Vol 55, pages 1735 to 1736, 1933: and *ibid*, Vol 68, pages 1881 to 1883, 1946. Suitable bifunctional silylating agents include hexa(lower)alkyldisilazane such as hexamethyldisilazane, hexaethyldisilazane and hexaisopropylsilane, tri-substituted alkylhalosilanes such as trimethylchlorosilane, tripropylchlorosilane and tributylchlorosilane, mixed trialkylhalosilanes such as methyldiethylchlorosilane, ethyldimethylchlorosilane and the like. The alkylhalosilanes are well known to the art in *Chem. Ber.*, Vol 92, pages 1638 to 1643, 1949; *Chem. Abst.*, Vol 51, page 257, 1957; British Pat. No. 822,970; *Comprehensive Inorganic Chemistry*, Vol 7, pages 111 to 112, 1958; *Basic Principles of Org. Chem.*, by Roberts and Caserio, Chap. 31, pages 1182 to 1184, 1964; and in other references as cited therein. Suitable catalysts for silylating with bifunctional silylators include tri(lower)alkylhalosilanes such as trimethylchlorosilane and triethylchlorosilane, and mixtures thereof. Exemplary of suitable organic solvents include tetrahydrofuran, dioxane, pyridine cyclopentane, n-heptane, acetonitrile, dimethylformamide, dimethylsulfoxide, singly, and mixtures thereof, are the like. The product is recovered from the reacting medium by standard chemical techniques, such as first concentrating to dryness and then dissolving the residue in an organic solvent such as carbon tetrachloride, chloroform and methylene chloride, followed by conventionally separating the solvent phase therefrom. The separated organic solvent phase is then filtered and evaporated to yield the desired silyl of prostaglandin. These processes can also silylate the carboxyl terminal. The terminal group can be left as such or specifically hydrolyzed by brief treatment with, for example, an aqueous medium at pH 4-6.

The lower alkylsilyl ether of prostaglandins ($R_1$=H) can be converted to the non-toxic, pharmaceutically acceptable salt by neutralizing the prostaglandin with an equivalent or an excess amount of the appropriate non-toxic salt forming inorganic or organic base. The non-toxic salts are prepared by procedures known to the art, for example, equivalent or stoichiometric amounts of the prostaglandin and the organic base are dissolved in an inert organic solvent at room temperature or in a warmed solvent with a gentle mixing of the reacting prostaglandin and the base until all the reactants are in solution. The product or salt is then obtained by chilling the resulting mixture to precipitate the powder or crystals, or the product can be recovered by the addition of a miscible diluent of low polarity, or by the use of standard evaporation techniques. The formation of the inorganic salts is also carried out by procedures known to the art; for example, the prostaglandin is first dissolved in a solution containing stoichiometric amounts or an excess amount of a non-toxic salt forming inorganic hydroxide, carbonate or the like. This reaction can be carried out in the presence of an inert organic solvent, and the product obtained by procedures such as the evaporation of the solvent, by the addition of miscible solvents of low polarity or by chilling the mixture to precipitate the product.

The lower alkyl ester of the prostaglandins is obtained by standard chemical techniques consisting of the treatment of the prostaglandin acid with a solution containing diazo(lower)alkanes to produce the prostaglandin ester. Esterification of the prostaglandin acid is performed by reacting the acid with the diazoalkane, for example, diazomethane, diazoethane, diazopropane, diazobutane, etc., in an inert organic solvent, for example, lower alkanols, symmetrical and unsymmetrical ethers, halogenated solvents, such as ethanol, methanol, diethyl ether, methylethyl ether, tetrahydrofuran, acetone, chloroform, etc., or with mixtures thereof. The exterification reaction is usually performed at a temperature of 0° to 75°C, usually at room temperature and atmospheric pressure, with the ester recovered by evaporation of the solvent and like techniques. The esterification reaction is described in *Organic Chemistry*, by Fieser and Fieser, pages 180 to 181, 1944.

The following examples are set forth as representative methods that are illustrative of the spirit of the present invention. These examples are not to be construed as limiting the scope of this invention as other functionally equivalent means will be readily apparent to those skilled in the subject art in the light of the present disclosure and the accompanying claims.

EXAMPLE 1

To a solution of 5 mg of $9\alpha,11\alpha(S)$-trihydroxy-13-trans-prostenoic acid in 10 ml of dry acetone at a room temperature of 25°C there is added an excess of, 5 ml of dry hexamethyldisilazane and the mixture gently stirred to ensure a uniform mixing of the reactants. The reacting mixture is then allowed to stand about 14 to 18 hours and the excess reagents are evaporated under a stream of inhouse dry nitrogen. The residue obtained is dissolved in a few ml of acetone, filtered and again evaporated to yield the desired product $9\alpha,11\alpha,15(S)$-tris(trimethylsilyloxy)-13-trans-prostenoic acid, mixed with its ester, trimethylsilyl $9\alpha,11\alpha,15$-(S)-tris(trimethylsilyloxy)-13-trans-prostenoate.

EXAMPLE 2

To a solution of 5 mg of methyl $9\alpha,11\alpha,15(S)$-trihydroxy-13-trans-prostenoate in 15 ml of anhydrous tetrahydrofuran there is added with gentle shaking 1.5 ml of hexamethyldisilazane and 0.5 ml of trimethylchlorosilane and the mixture allowed to stand at room temperature for 3 to 7 hours. Next, the solution is evaporated to dryness, and the residue is dissolved in tetrahydrofuran, filtered and again evaporated to dryness to yield methyl $9\alpha,11\alpha,15(S)$-tris(trimethylsilyloxy)-13-trans-prostenoate.

EXAMPLE 3

Repeating the procedure of Example 2 but replacing methyl $9\alpha,11\alpha,15(S)$-trihydroxy-13-trans-prostenoate with:

methyl $11\alpha,15(S)$-dihydroxy-9-oxo-13-trans-prostenoate, $11\alpha,15(S)$-dihydroxy-9-oxo-13-trans-prostenoic acid, $11\alpha,15(S)$-dihydroxy-9-oxo-5cis,13-trans-prostadienoic acid, $11\alpha,15(S)$-dihydroxy-9-oxo-5-cis,13-trans,17-cis-prostatrienoic acid, $11\alpha,15(R)$-dihydroxy-9-oxo-5-cis,13-trans-prostadienoic acid, $11\alpha,15(R)$-dihydroxy-9-oxo-13-trans-prostenoic acid, racemic $11\beta,15(S)$-dihydroxy-9-oxo-13-trans-prostenoic acid, racemic 11β,15(R)-dihydroxy-9-oxo-13-trans-prostenoic acid,
enantio 11α,15(R)-dihydroxy-9-oxo-13-trans-prostenoic acid,
ethyl 11α,15(R)-dihydroxy-9-oxo-13-trans-prostenoate; the following ethers are formed:
methyl 11α,15(S)-bis(trimethylsilyloxy)-9-oxo-13-trans-prostenoate,
11α15(S)-bis(trimethylsilyloxy)-9-oxo-13-trans-prostenoic acid,
11α,15(S)-bis(trimethylsilyloxy)-9-oxo-5-cis,13-trans-prostadienoic acid,
11α,15(S)-bis(trimethylsilyloxy)-9-oxo-5-cis,13-trans-17-cis-prostatrienoic acid,
11α,15(R)-bis(trimethylsilyloxy)-9-oxo-5-cis,13-trans-prostadienoic acid,
11α,15(R)-bis(trimethylsilyloxy)-9-oxo-13-trans-prostenoic acid,
racemic 11β,15(S)-bis(trimethylsilyloxy)-9-oxo-13-trans-prostenoic acid,
racemic 11β,15(R)-bis(trimethylsilyloxy)-9-oxo-13-trans-prostenoic acid,
enantio 11α,15(R)-bis(trimethylsilyloxy)-9-oxo-13-trans-prostenoic acid,
ethyl 11α,15(R)-bis(trimethylsilyloxy)-9-oxo-13-trans-prostenoate.

EXAMPLE 4

To 50 mg of 9α,11α,15(S)-trihydroxy-5-cis,13-trans-prostadienoic acid dissolved in 20 ml of anhydrous pyridine there is added 20 ml of hexamethyldisilazane and 10 ml of trimethylchlorosilane and the silylation is permitted to react for about 1½ hours at 25°C. Next, there is added 50 ml of chloroform to the silylating reaction medium and the just produced mixture is washed 3 or 4 times with aliquots of water. Next, the remaining organic phase is filtered through a silica gel filter and the filtered organic chloroform phase is evaporated to dryness under a light stream of nitrogen to yield 9α,11α,15(S)-tris(trimethylsilyloxy)-5-cis,13-trans-prostadienoic acid.

EXAMPLE 5

Repeating the procedure of Example 4 but replacing 9α,11α,15(S)-trihydroxy-5-cis,13-trans-prostadienoic acid with:
9α,11α15(R)-trihydroxy-5-cis,13-trans-prostadienoic acid,
enantio 9α,11α,15(S)-trihydroxy-5-cis-13-trans-prostadienoic acid,
iso-propyl 9α,11α,15(S)-trihydroxy-5-cis,13-trans-prostadienoate,
9α,11α,15(S)-trihydroxy-13-trans-prostenoic acid,
racemic 9α,11β,15(R)-trihydroxy-13-trans-prostenoic acid,
racemic 9β,11β,15(R)-trihydroxy-13-trans-prostenoic acid,
9α,11α,15(S)-trihydroxy-5-cis,13-trans,17-cis,prostatrienoic acid,
15(S)-hydroxy-9-oxo-10,13-trans-prostadienoic acid,
enantio 15-(S)-hydroxy-9-oxo-10,13-trans-prostadienoic acid,
enantio 15(R)-hydroxy-9-oxo-10,13-trans-prostadienoic acid,
15(S)-hydroxy-9-oxo-5-cis,10,13-trans-prostatrienoic acid,
15(S),19-dihydroxy-9-oxo-10,13-trans-prostadienoic acid,
15(S)-hydroxy-9-oxo-8(12),13-trans-prostadienoic acid,
15(S)-hydroxy-9-oxo-5-cis,8(12),13-trans-prostatrienoic acid, the following ethers are formed:
9α,11α,15(S)-tris-(trimethylsilyloxy)-5-cis,13-trans-prostadienoic acid,
enantio 9α,11α,15(S)-tris(trimethylsilyloxy)-5-cis-13-trans-prostadienoic acid,
iso-propyl 9α,11α,15(S)-tris(trimethylsilyloxy)-5-cis-13-trans-prostadienoate,
9α,11α,15(S)-tris(trimethylsilyloxy)-13-trans-prostenoic acid,
racemic 9α,11β,15(R)-tris(trimethylsilyloxy)-13-trans-prostenoic acid,
racemic 9β,11β,15(R)-tris(trimethylsilyloxy)-13-trans-prostenoic acid,
9α,11α,15(S)-tris(trimethoxysilyloxy)-5-cis,13-trans,17-cis,prostatrienoic acid,
15(S)-trimethylsilyloxy-9-oxo-10,13-trans-prostadienoic acid,
enantio 15(S)-trimethylsilyloxy-9-oxo-10,13-trans-prostadienoic acid,
enantio 15(R)-trimethylsilyloxy-9-oxo-10,13-trans-prostadienoic acid,
15(S)-trimethylsilyloxy-9-oxo-5-cis,10,13-trans-prostatrienoic acid,
15(S),19-bis(trimethylsilyloxy)-9-oxo-10,13-trans-prostadienoic acid,
15(S)-trimethylsilyloxy-9-oxo-8(12),13-trans-prostadienoic acid, and
15(S)-trimethylsilyloxy-9-oxo-5-cis,8(12),13-trans-prostatrienoic acid.

EXAMPLE 6

To 10 mg of 9α,11α,15(S)-trihydroxy-5-cis, 13-trans-prostadienoic acid dissolved in 10 ml of anhydrous pyridine is added 2 ml of triethylchlorosilane and the reactant allowed to react at 25°C of 6 hours. Next, the solvent is evaporated to dryness and the residue is taken up in chloroform. The chloroform solution is washed with 3 or 4 aliquots of water and the washed chloroform solution is again evaporated to dryness to yield 9α,11α,15(S)-tris(tri-ethylsilyloxy)-5-cis,13-trans-prostadienoic acid.

EXAMPLE 7

Repeating the procedure of Example 6 but replacing the prostadienoic acid with the replacing prostenoic, prostadienoic and prostatrienoic acids of Example 5 the following ethers are formed:
9α,11α,15(S)-tris(triethylsilyloxy)-5-cis,13-trans-prostadienoic acid,
9α,11α,15(S)-tris(triethylsilyloxy)-13-trans-prostenoic acid,
9α,11α,15(S)-tris(triethylsilyloxy)-5-cis,13-trans,17-cis,prostatrienoic acid,
15(S)-triethylsilyloxy-9-oxo-10,13-trans-prostadienoic acid,
15(S)-triethylsilyloxy-9-oxo-5-cis,10,13-trans-prostatrienoic acid,
15(S),19-bis(triethylsilyloxy)-9-oxo-10,13,trans-prostadienoic acid,
15(S)-triethylsilyloxy-9-oxo-8(12),13-trans-prostadienoic acid, and 15(S)-triethylsilyloxy-9-oxo-5-cis,8(12),13-trans-prostatrienoic acid.

EXAMPLE 8

Following the procedure of Examples 6 and 7, but replacing the tri(lower)alkylhalosilane of the examples with the following tri(lower)alkylhalosilane:
tri-n-propylchlorosilane,
tri-iso-propylchlorosilane,
tri-n-butylchlorosilane,
triiso-butylchlorosilane,
tri-n-pentylchlorosilane,
tri-n-hexylchlorosilane,
the following ethers embracing all the alkyl groups within the term lower alkyl are formed:
9α,11α,15(S)-tris(triloweralkylsilyloxy)-13-trans-prostenoic acid,
9α,11α,15(S)-tris(triloweralkylsilyloxy)-5-cis,13-trans-prostadienoic acid,
9α,11α,15(S)-tris(triloweralkylsilyloxy)-5-cis,13-trans,17-cis-prostatrienoic acid,
15(S)-triloweralkylsilyloxy-9-oxo-10,13-trans-prostadienoic acid,
15(S)-triloweralkylsilyloxy-9-oxo-5-cis,10,13-trans-prostatrienoic acid,
15(S)-triloweralkylsilyloxy-9-oxo-8(12),13-trans-prostadienoic acid, and
15(S),19-bis(triloweralkylsilyloxy)-10,13-trans-prostadienoic acid.

EXAMPLE 9

Following the procedure of Example 8 but replacing the tri(lower)alkylhalosilanes of the example with the following di(lower)alkylhalosilanes:
dimethylchlorosilane,
diethylchlorosilane,
di-n-propylchlorosilane,
diisopropylchlorosilane,
di-n-butylchlorosilane,
diisopropylchlorosilane,
dipentylchlorosilane,
di-n-hexylchlorosilane,
the following ethers embracing all the alkyl groups within the lower alkyl group are formed:
9α,11α,15(S)-tris(diloweralkylsilyloxy)-13-trans-prostenoic acid,
9α,11α,15(S)-tris(diloweralkylsilyloxy)-5-cis,13-trans-prostadienoic acid,
9α,11α,15(S)-tris(diloweralkylsilyloxy)-5-cis,13-trans, 17-cis-prostatrienoic acid,
15(S)-diloweralkylsilyloxy-9-oxo-10,13-trans-prostadienoic acid,
15(S)-diloweralkylsilyloxy-9-oxo-5-cis,10,13-trans-prostatrienoic acid,
15(S)-diloweralkylsilyloxy-9-oxo-8(12),13-trans-prostadienoic acid, and
15(S),19-bis(diloweralkylsilyl)-10,13-trans,prostadienoic acid.

EXAMPLE 10

Repeating the procedure of Example 9 but substituting for the di(lower)alkylhalosilane with mixed (lower)alkylhalosilane such as ethyldimethylchlorosilane, ethyldi-n-propyl-chlorosilane, methyldibutylchlorosilane, methylethylchlorosilane, and the like, the corresponding mono-(lower)alkyldi(lower)alkyl prostenoic, prostadienoic and prostatrienoic acids are produced.

EXAMPLE 11

The compound 9α-hydroxy,11α,15(S)-bis(triloweralkylsilyloxy)-13-trans-prostenoic acid is prepared by the reduction of the corresponding 11α,15(S)-bis(trilower-alkylsilyloxy)-9-oxo-13-trans-prostenoic acid using $NaB(R)_nH_{4-n}$ wherein R is a lower alkyl of 1 to 4 and $n$ is 0 to 4, such as sodium borohydride, in an inert organic solvent at a temperature of 0° to 30°C for about 15 minutes to 1 hour to give the above described prostaglandin ether. A typical procedure is performed by the reduction of the keto group with sodium borohydride in methanol at 0°C for 20 minutes with subsequent chromatographic separation on silica gel or alumina to give the prostaglandin ether.

EXAMPLE 12

Examples of other lower alkylsilyloxy prostenoic, prostadienoic and prostatrienoic acids, and mixed loweralkylsilyloxy prostenoic, prostadienoic and prostatrienoic acid prepared according to the mode and the manner of the present disclosure are the followinG:
11α,15(S)-bis(diloweralkylsilyloxy)-9-oxo-13-trans-prostenoic acid,
11α,15(S)-bis(diloweralkylsilyloxy)-9-oxo-5-cis,13-trans-prostadienoic acid,
11α,15(S)-bis(diloweralkylsilyloxy)-9-Oxo-5-cis, 13-trans,17-cis-prostatrienoic acid,
11α,15(S)-bis(diloweralkylsilyloxy)-9-oxo-prostanoic acid,
11α,15(S)-bis(diloweralkylsilyloxy)-9-oxo-13-trans-8-iso-prostenoic acid,
11α,15(S)-bis(diloweralkylsilyloxy)-9-oxo-13-trans-ω-homo-prostenoic acid,
11α,15(S)-bis(triloweralkylsilyloxy)-9-oxo-13-trans-prostenoic acid,
11α,15(S)-bis(triloweralkylsilyloxy)-9-oxo-5-cis,13-trans-prostadienoic acid,
11α,15(S)-bis(triloweralkylsilyloxy)-9-oxo-5-cis,13-trans,17-cis-prostatrienoic acid,
11α,15(S)-bis(triloweralkylsilyloxy)-9-oxo-prostanoic acid,
11α,15(S)-bis(triloweralkylsilyloxy)9-oxo-13-trans-8-iso-prostenoic acid,
11α,15(S)-bis(triloweralkylsilyloxy)-9-oxo-13-trans-ω-homo-prostenoic acid, and the like.

DESCRIPTION OF INVENTIVE APPLICATIONS

The novel (lower)alkylsilyl prostaglandin ether compositions of matter of the invention as embraced by Formula I possess valuable and useful properties. The prostaglandin ethers of said compositions are characterized by their ability to serve as a source of the parent prostaglandin following the in vivo metabolic hydrolysis of the prostaglandin from the (lower)alkylsilyl moiety. The (lower)alkylsilyl ether prostaglandin are labile in aqueous media and body fluids and in acid aqueous media and acid environments such as gastric-like environmental conditions where they release upon hydrolysis of the (lower)-alkylsilyl ether of prostaglandin, the freed, parent prostaglandin from the biologically inert alkylsilyl moiety. For example, prostaglandin ethers with a R-3 keto group and one or both of the R-5 and R-7 positions substituted with a (lower)alkylsilyl group on in vivo separation of the latter group with formation of hydroxyl groups make available the parent prostaglandins that possess pharmacological properties, including the ability to lower blood pressure, and relieve asthma and nasal congestion. These parent prostaglandins are therefore useful for the management of hypertension in avians, mammals, including farm animals and in laboratory animals. Following the liberation of the (lower)alkylsilyl group and with concomitant formation of hydroxyl groups in vivo, these will produce for example, 11α,15(S)-dihydroxy-9-oxo-5-cis,13-trans-prostadienoic acid; the latter compound when administered at the rate of 0.5μg/min intravenously, or 2mg/2 hrs intravaginally, or 0.5mg/2 hrs orally, is known to stimulate smooth muscles to be effective in mammals for the induction of labor. Representative prostaglandin ethers for obtaining prostaglandins that possess the set forth properties include 11α,15(S)-bis(trilower alkylsilyloxy)-9-oxo-13-trans-prostenoic acid; 11α,15(S)-bis(trilower alkylsilyloxy)-9-oxo-5-cis,13-trans-prostadienoic acid; 11α,15(S))-bis(trilower alkylsilyloxy)-9-oxo-5-cis,13-trans,17-cis-prostatrienoic acid; and the like.

The compositions containing prostaglandin ethers substituted at the R-3, R-5 and R-7 positions with a tri(-lower)-alkylsilyl group on the liberation of the latter groups, and with concomitant in vivo formation of hydroxyl groups at the R-3, R-5 and R-7 position, will produce prostaglandins possessing smooth muscle stimulating activity, for example, 9α,11α,15(S)-trihydroxy-13-trans-prostenoic acid, 9α,11α,15(S)-trihydroxy-5-cis,13-trans-prostadienoic acid, and the like, which latter compounds when administered intravenously (5μg/min) or intravaginally (25mg/2 hrs) is known to induce labor in mammals. Exemplary of prostaglandin silyl ethers that furnish the corresponding prostaglandis which latter prostaglandins possess smooth muscle activity are 9α,11α,15(S)-tris(trimethylsilyloxy)-13-trans-prostenoic acid: 9α,11α,15(S)-tris(trimethylsilyloxy)-5-cis,13-trans-prostadienoic acid; 9α,11α,15(S)-tris(trilower alkylsilyloxy)-5-cis,13-trans,17-cis-prostatrienoic acid; and the like.

The pharmaceutical compositions containing prostaglandin ethers that supply in vivo a physiologically active parent prostaglandin characterized by a R-3 keto group and (1) a R-5 and R-7 hydroxyl group or (2) a R-3, R-5 and R-7 hydroxyl group are physiologically useful not only for stimulating muscles for inducing labor but also menses and for the termination of pregnancy. Representative of prostaglandin ethers that can serve as an in vivo source of physiologically active prostaglandins when administered for example intravenously at the rate of 0.1μ to 1.0μg/min, calculated as freed prostaglandins are ethers such as 9α,11α,15(S)-tris(tri(lower)alkylsilyloxy)-13-trans-prostenoic acid; 9α,11α,15(S)-tris(tri(lower)alkylsilyloxy)-5-cis,13-trans-prostadienoic acid; 9α,11α,15(S)-tris(tri(lower)alkylsilyloxy)-5-cis,13-trans,17-cis-prostatrienoic acid; 11α,15(S)-bis(tri(lower)alkylsilyloxy)-9-oxo-5-cis,13-trans-prostadienoic acid: 11α,15(S)-bis(tri(lower)alkylsilyloxy)-9-oxo-13-trans-prostenoic acid, and the like.

The pharmaceutical compositions containing the prostaglandin ethers can be used for the relief of asthma, nasal congestion and inhibition of lipolysis by supplying from prostaglandin ethers substituted with a R-3 keto and a R-5 lower alkylsilyl group or a prostaglandin ether substituted with a R-3 keto and at R-5 and R-7 a lower alkylsilyl group the corresponding parent prostaglandins possessing the desired therapeutic utility. Exemplary of prostaglandin ethers for producing the corresponding parent prostaglandins include 15(S)-tri(lower)alkylsilyloxy-9-oxo-10,13-trans-prostadienoic acid; 15(S)-tri(lower)alkylsilyloxy-5-cis,10,13-trans-prostatrienoic acid; 11α,15(S)-bis[tri(lower)alkyl-silyloxy]-9-oxo-5-cis, 13-trans-prostadienoic acid, and the like.

The pharmaceutical composition containing prostaglandin ethers substituted with a R-3 keto group and additionally with a R-7 or a R-5 and R-7 lower alkylsilyl group are useful for the management of gastric secretions. These prostaglandin ethers release the natural anti-secretory prostaglandin in the stomach upon the acidic hydrolysis of the prostaglandin ether to free the prostaglandin group of the prostaglandin ether from the affixed alkylsilyloxy moiety. The prostaglandin ether's ability to release free prostaglandin under gastric-like environmental conditions is demonstrated by standard experiments using an artificial gastric juice consisting essentially of mineral acid, hydrochloric, at varying pH from 1 to 4.5 at 37°C. For example 11α,15-(S)-bis(trimethylalkylsilyloxy)-9-oxo-5-cis,13-transprostadienoic acid releases the active parent compound 11α,15(S)-dihydroxy-9-oxo-5-cis,13-trans-prostadienoic acid at pH 2 to 4 at 37°C. The immediately described ethers are therapeutically indicated for regulating gastric secretions, that is, hyperacidity, because as the pH of the stomach reaches 4.5 to 5 the hydrolysis rate of the prostaglandin ether is decreased, and, as the prostaglandin ether passes from the stomach into the intestine, an unwanted increased intestine peristalsis or increased intestinal motility with the accompanying bowel actions and diarrhea following administration of the natural form of the prostaglandins in the intestine are essentially absent for the unhydrolyzed prostaglandin ethers of the present pharmaceutical compositions.

The prostaglandin ether's ability to release prostaglandin and stimulate muscle is determined by standard laboratory techniques, for example, by adding small amounts, 10 micrograms, 50 micrograms, etc., of the prostaglandin ether to hydrogen ion environments at varying pH and then detecting the presence of freed prostaglandin by conventional muscle bioassay. For example, the addition of 9α,11α,15(S)-tris(trimethylsilyloxy)-5-cis,13-trans-prostadienoic acid, and for racemic 9α,11α,15(S)-tris(trimethylsilyloxy)-5-cis,13-trans-prostadienoic acid to a hydrogen ion environment, indicated by bioassay, for example, contraction of isolated rat urine or gerbil colon strips that hydrolysis of the ether linkage occurs to release the corresponding prostaglandin. Standard procedures are described in *Methods of Biochemical Analysis*, Vol 17, pages 325 to 371, 1969.

The therapeutic usefulness of the pharmaceutical compositions containing prostaglandin ethers is demonstrated in vivo with studies using standard laboratory rats by intragastric administration. First, the normal gastric hydrogen ion secretion of the animal is measured, followed by intravenous injection if histamine (500μg/kg) or the synthetic compound, gastrin, commercially available from Imperial Chemical Industries, Ltd., as ICI-50,123, (4μg/kg). Having established the normal hydrogen ion output in response to such a stimulus, the stimulation is then repeated while a prostaglandin ether, for example, 11α,15(S)-bis(trimethylsilyloxy)-9-oxo-13-trans-prostenoic acid is perfused across the gastric mucosa at the rate of 0.1 to 1μg/min up to 10 hours and gastric perfusates are again collected through the pylorus and titrated with base, for example, sodium hydroxide, to determine the hydrogen ion output. The inhibition of gastric secretion in response to histamine or gastrin induced by the presence of prostaglandin ether can then be expressed as percent inhibition of hydrogen ion output. Utilizing this standard procedure, the parent prostaglandins evoke about 30 to 60 percent reduction in induced gastric secretion.

The prostaglandin ethers of the invention also possess desirable partition coefficients between aqueous and lipid phases and they are therefore adaptable for administering for their physiological effects from drug delivery systems, such as intrauterine contraception devices, skin drug delivery bandages and the like, manufactured from naturally occurring and synthetic polymeric materials. This novel and useful property of the prostaglandin ethers make possible their diffusion at measurable controlled rates through polymeric materials such as polyvinylchloride, polyisoprene, polybutadiene, polyethylene, ethylene-vinyl acetate, collagen, polydimethylsiloxanes, hydrophilic hydrogels of esters of acrylic and methacrylic acids, polyvinyl acetates, propylene-vinyl acetate copolymers, and the like.

The prostaglandin ethers of this invention can be used by the pharmaceutical and the veterinary arts in a variety of pharmaceutical preparations or veterinary preparations. In these preparations, the new compounds are administrable in the form of tablets, pills, powders, capsules, injectables, solutions, suppositories, emulsions, dispersions, food premix and in other suitable forms. The pharmaceutical or veterinary preparation which contains the compound is conveniently admixed with a non-toxic pharmaceutical organic carrier or a non-toxic pharmaceutical inorganic carrier. Typical of pharmaceutically acceptable carriers, are for example, water, gelatine, lactose, starches, magnesium stearate, talc, vegetable oils, polyalkylene glycols, petroleum jelly and other conventionally employed pharmaceutically acceptable carriers. The pharmaceutical preparation may also contain non-toxic auxiliary substances such as emulsifying, preserving, setting agents and the like, as for example, sorbitan monolaurate, triethanolamine oleate, polyoxyethylene sorbitan monopalmityl, dioctyl sodium sulfosuccinate, and the like.

Exemplary of a typical method for preparing a tablet containing the active ingredient is to first suitably comminute the active ingredient with a diluent such as starch, sucrose, kaolin or the like to form a powder mixture. Next, the just prepared mixture can be granulated by wetting with a non-toxic binder such as a solution of gelatin, acacia mucilage, corn syrup and the like and after mixing the composition is screened to any predetermined particle sieve size. As an alternative, if preferred to granulation, the just prepared mixture can be slugged through conventional tablet machines and the slugs comminuted before the fabrication of the tablets. The freshly prepared tablets can be coated or they can be left uncoated. Representative of suitable coatings are the non-toxic coatings including shellac, methylcellulose, carnauba wax, styrenemaleic acid copolymers and the like. For oral administration, compressed tablets containing 0.01 milligram, 5 milligrams, 25 milligrams, 50 milligrams, etc., up to 1500 milligrams, and the like, are manufactured in the light of the above disclosure and by art known fabrication techniques well known to the art and set forth in *Remington's Pharmaceutical Science*, Chapter 39, Mack Publishing Co., 1965. The pharmaceutical manufacture of a formulation is shown in Example 13:

EXAMPLE 13

| | Per tablet, mg |
|---|---|
| Prostaglandin silyl ether | 2.0 |
| Corn Starch | 15.0 |
| Corn starch paste | 4.5 |
| Lactose | 82.0 |
| Calcium stearate | 2.0 |
| Dicalcium phosphate | 50.0 |

To formulate the tablet, uniformly blend the prostaglandin ether, corn starch, lactose and dicalcium phosphate in a V-blender until all the ingredients are uniformly mixed together. Next, the corn starch is prepared as a 10 percent peanut oil paste and it is blended with the uniform mixture until a uniform mixture is obtained. Then, the wet granulation is passed through a standard eight mesh screen, dried and rescreened with a 12 mesh screen. The dry granules are next blended with calcium stearate and compressed into tablets. Other tablets containing 0.05, 0.25, 1.0, 5.0, 10.0 mgs, etc. are prepared in a like fashion.

The manufacture of capsules containing 0.1 milligram to 500 milligrams for oral use consists essentially of mixing the active compound with a non-toxic carrier and enclosing the mixture in a gelatin sheath. The capsules can be in the art known soft form of a capsule made by enclosing the compound in intimate dispersion within an edible oil or the capsule can be a hard capsule consisting essentially of the novel compound mixed with a non-toxic solid such as talc, calcium stearate, calcium carbonate or the like. Exemplary of a typical use employing capsules containing 25 mg 11α,15(S)-bis (trimethylsilyloxy)-9-oxo-13-trans-prostenoic acid is therapeutically indicated ad libitum for inhibiting gastric secretions with lesser amounts indicated as the pH of the stomach of about 4 to 5.

The daily dose administered for the compounds will of course vary with the particular novel prostaglandin ether employed because of the varying potency of the compounds, the chosen route of administration and the size of the recipient. The dosage administered is not subject to definite bounds, but it will usually be an effective amount or the equivalent on a molar basis, of the pharmacologically active free acid form produced upon the metabolic release of the prostaglandin to achieve the biological function of the prostaglandin. Representative of a typical method for administering the lower alkylsilyl prostaglandin ethers of the invention is by the injectable-type administration route. By this route, a sterile solution containing the compound is administered intravenously or subcutaneously at the rate of 0.01 microgram to 0.50 microgram per kilogram of body weight per minute by means of an infusion pump at the rate of 10 to 15 milliters per hour. For example, the compound 9α,11α,15(S)-tris(triethylsilyloxy)-13-trans-prostenoic acid can be administered by this route by producing stimulation of smooth muscles; 11α,15(S)-bis(triethylsilyloxy)-9-oxo-13-trans-prostenoic acid can be administered by this route for regulating the acidic gastric concentration and the volume of gastric secretion. Another typical method for administering the prostaglandin ether is by the oral route. By the oral route, 10 µg to 75 µg per kg of recipient per day is administered to evoke the desired effects. Thus, for a typical 75 kg recipient the daily dose is about 750 µg to 4125 µg. The compound is administered by the injectable route in a form suited for injection, such as mixed with sterile, non-aqueous pharmaceutical carriers, often having incorporated therein an agent that delays absorption such as aluminum monostearate and the like.

Suitable topical preparations containing the novel prostaglandin ethers can easily be prepared by, for example, mixing 500 mg of the lower alkylsilyloxy prostaglandin with 15 g of vegetable oil, 1 g of sodium lauryl sulfate, 40 g of liquid silicone D.C. 200 sold by Dow Corning Co., Midland, Michigan, 43 g of sterile water, 0.25 g of methylparaben and 0.15 g of propylparaben and warming the mixture with constant stirring to about 75°C and then permitting the preparation to congeal. The preparation containing the prostaglandin ether can be readily applied to the skin by inunction or it can be applied topically by dispensing the preparation from a conventional surgical gauze dispenser, and the like. The prostaglandin ethers penetrate the outermost layer of the skin, the stratum corneum, more readily then unetherified prostaglandins and as such as the prostaglandins' ethers lend themselves to topical administration. Suitable procedures for preparing topical applications are set forth in *Remington's Pharmaceutical Science*, Chapter 37, as cited supra.

The compounds of this invention can also be conveniently administered in aerosol dosage form. An aerosol form can be described as a self-containing sprayable product in which the propellant force is supplied by a liquified gas. For administering a self-propelled dosage form of about 100 micrograms to 250 milligrams that is used about 3 or 4 times daily for inhalation therapy, the bronchodialator 11α,15(S)-bis(triisopropylsilyloxy)-9-oxo-5-cis-13-trans-prostadienoic acid is suspended in an inert, non-toxic propellant in a commercially available compressed-gas aerosol container. Suitable propellants include trichloromonofluoromethane, dichlorodifluoromethane, dichlorodifluoroethane, monochlorodifluoroethane and mixtures thereof. The inert gas can also be mixed with non-toxic, co-solvents, if desired, to produce the aerosol form. If the compound is administered by oral inhalation employing conventional nebulizers, it is convenient to dilute about 1 part of the prostaglandin ether with about 1,000 to 10,000 parts of carrier, for administering 3 or 4 times per day.

For administering to valuable domestic household, sport or farm animals such as sheep, goats, cattle, etc., or for administering to laboratory animals for scientific studies, the compound is prepared in the form of a food premix, such as mixing with dried fish meal, oatmeal, straw, hay, ground corn, mash, and the like, and then the prepared premix is added to the regular feed, thereby administering the compound to the domestic or laboratory animal in the form of feed.

In laboratory studies for determining the applicability of the prostaglandin ethers to mammals, primates, avians, and valuable animals, the studies are carried out with rats, guinea pigs, gerbils, mice, etc. For example, in laboratory gastric anti-secretory studies with standard white laboratory rats, the compound 9α,11α,15(S)-tris(tripropylsilyloxy)-13-trans-prostenoic acid is administered orally by perfusion in saline at the rate of 0.1 microgram to 1.0 microgram per minute across the mucosal surface of the stomach to essentially inhibit release of titratable acidity, or for determining smooth muscle effects, and the like.

The above examples and disclosure are set forth merely for illustrating the mode and the manner of the invention and various modifications and embodiments can be made by those skilled in the art in the light of the invention without departing from the spirit of the invention.

We claim:

1. A pharmaceutical composition of matter comprising a member selected from the group consisting of a lower alkylsilyl prostaglandin ether, the diaesteromers, and the non-toxic therapeutically acceptable salts and wherein the prostaglandin ether has the following formula:

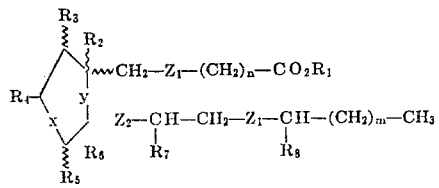

wherein $R_1$ is a member selected from the group consisting of hydrogen, lower alkyl of 1 to 8 carbons inclusive and $R_9$; $R_2$ and $R_6$ are both hydrogen when y is a single bond and $R_2$ and $R_6$ are both absent when y is a double bond; $R_3$ is a member selected from the group consisting of keto,

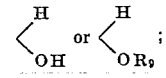

; $R_4$ is a member selected from the group consisting of hydrogen and

$R_5$ is a member selected from the group consisting of hydrogen,

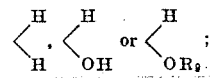

$R_7$ is $OR_9$; $R_8$ is a member selected from the group consisting of hydrogen and $OR_9$; $R_9$ is a silyl group

wherein $R_{10}$ selected from the group consisting of hydrogen and lower alkyl; $R_{11}$ and $R_{12}$ are lower alkyl groups; $Z_1$ is a member selected from the group consisting of cis and trans unsaturated —CH=CH— and —CH$_2$CH$_2$—; $Z_2$ is a member selected from the group consisting of trans —CH=CH— and —CH$_2$CH$_2$—; x is a member selected from the group consisting of a single bond and a double bond and x is a double bond when both $R_4$ and $R_5$ are hydrogen; $y$ is a member selected from the group consisting of a single bond and a double bond; and wherein $n$ is 2 to 5, $m$ is 0 to 4; and wherein the pharmaceutical composition consists essentially of 0.01 milligrams to 1,500 milligrams of the prostaglandin silyl ether and a non-toxic pharmaceutically acceptable carrier.

2. A pharmaceutical composition according to claim 1 wherein the silyl prostaglandin ether is 11α,15(S)-bis(diloweralkylsilyloxy)-9-oxo-13-trans-prostenoic acid.

3. A pharmaceutical composition according to claim 1 wherein the silyl prostaglandin ether is 11α,15(S)-bis-(triloweralkylsilyloxy)-9-oxo-13-trans-prostenoic acid.

4. A pharmaceutical composition according to claim 1 wherein the silyl prostaglandin ether is 11α,15(S)-bis-(diloweralkylsilyloxy)-9-oxo-5-cis-13-trans-prostadienoic acid.

5. A pharmaceutical composition according to claim 1 wherein the silyl prostaglandin ether is 11α,15(S)-bis-(triloweralkylsilyloxy)-9-oxo-5-cis-13-trans-prostadienoic acid.

6. A pharmaceutical composition according to claim 1 wherein the silyl prostaglandin ether is 9α,11α,15(S)-tris-(diloweralkylsilyloxy)-13-trans-prostenoic acid.

7. A pharmaceutical composition according to claim 1 wherein the silyl prostaglandin ether is 9α,11α,15(S)-tris-(triloweralkylsilyloxy)-13-trans-prostenoic acid.

8. A pharmaceutical composition according to claim 1 wherein the silyl prostaglandin ether is 9α,11α,15(S)-tris(diloweralkylsilyloxy)-5-cis,13-trans-prostadienoic acid.

9. A pharmaceutical composition according to claim 1 wherein the silyl prostaglandin ether is 9α,11α,15(S)-tris(triloweralkylsilyloxy)-5-cis,13-trans-prostadienoic acid.

10. A pharmaceutical composition according to claim 1 wherein the silyl prostaglandin ether is 15(S)-(trilower-alkylsilyloxy)-9-oxo-10,13-trans-prostadienoic acid.

11. A pharmaceutical composition according to claim 1 wherein the silyl prostaglandin ether is 11α,15-(S)-bis-(triloweralkylsilyloxy)-9-oxo-13-trans-8-iso-prostenoic acid.

12. A pharmaceutical composition according to claim 1 wherein the silyl prostaglandin ether is 11α,15-(S)-bis(tri-loweralkylsilyloxy)-9-oxo-13-trans-homo-prostenoic acid.

13. A pharmaceutical composition according to claim 1 wherein the silyl prostaglandin ether is 15(S),1-9-bis(tri-loweralkylsilyloxy)-9-oxo-10,13-trans-prostadienoic acid.

14. A pharmaceutical composition according to claim 1 wherein the silyl prostaglandin ether is 11α,15-(S)-bis(tri-loweralkylsilyloxy)-9-oxo-prostanoic acid.

15. A pharmaceutical composition according to claim 1 wherein th silyl prostaglandin ether is the di(-lower)-alkylsilyl ether.

16. A pharmaceutical composition according to claim 1 wherein the silyl prostaglandin ether is the tri(-lower)-alkylsilyl ether.

* * * * *